United States Patent
Mayer et al.

(10) Patent No.: US 7,283,506 B2
(45) Date of Patent: Oct. 16, 2007

(54) SYSTEM AND METHOD FOR RELEASING SESSIONS AT NETWORK ENTITIES ASSOCIATED WITH THE SESSIONS

(75) Inventors: Georg Mayer, Espoo (FI); Hisham Khartabil, Helsinki (FI)

(73) Assignee: Nokia Corporation, Espoo (FI)

( * ) Notice: Subject to any disclaimer, the term of this patent is extended or adjusted under 35 U.S.C. 154(b) by 119 days.

(21) Appl. No.: 10/684,269

(22) Filed: Oct. 13, 2003

(65) Prior Publication Data

US 2005/0078642 A1 Apr. 14, 2005

(51) Int. Cl.
H04Q 7/24 (2006.01)
H04Q 7/00 (2006.01)
H04L 12/66 (2006.01)

(52) U.S. Cl. ............... 370/338; 370/328; 370/352

(58) Field of Classification Search ......... 370/338, 370/230.1, 352, 401, 355; 713/168; 455/404.1, 455/405, 406, 422.1; 709/230
See application file for complete search history.

(56) References Cited

U.S. PATENT DOCUMENTS

| | | | |
|---|---|---|---|
| 7,054,945 B2* | 5/2006 | Hurtta et al. ............. | 370/356 |
| 2002/0036983 A1* | 3/2002 | Widegren et al. ........ | 370/230.1 |
| 2004/0008669 A1* | 1/2004 | Bos et al. ................ | 370/352 |
| 2004/0109439 A1* | 6/2004 | Kiss et al. ............... | 370/352 |
| 2004/0176091 A1* | 9/2004 | Bajko et al. ............. | 455/435.1 |
| 2004/0184452 A1* | 9/2004 | Huotari et al. ........... | 370/384 |
| 2004/0196867 A1* | 10/2004 | Ejzak et al. ............. | 370/338 |
| 2004/0203710 A1* | 10/2004 | Gabor et al. ............ | 455/422.1 |

OTHER PUBLICATIONS

Global System for Mobile Communications, 3GPP TS 23.229 V6.2.0 (Jun. 2003), 3rd Generation Partnership Project; Technical Specification Group Core Network; IP Multimedia Call Control Protocol based on Session Initiation Protocol (SIP) and Session Description Protocol (SDP); Stage 3 (Release 5). pp. 1-257.
3GPP TS 23.228 V6.2.0 (Jun. 2003), 3rd Generation Partnership Project; Technical Specification Group Services and System Aspects; IP Multimedia Subsystem (IMS); Stage 2 (Release 6). pp. 1-143.
J. Rosenberg and H. Schulzrinne, A Session Initiation Protocol (SIP) Event Package for Dialog State. pp. 1-24.
J. Rosenberg and H. Schulzrinne, An INVITE Initiated Dialog Event Package for the Session Initiation Protocol (SIP) draft-ietf-sipping-dialog-package-02. pp. 1-30.
R. Sparks, The Session Initiation Protocol (SIP) Refer Method. pp. 1-23.
A.B. Roach, Session Initiation Protocol (SIP)—Specific Event Notification. pp. 1-38.
J. Rosenberg et al., SIP: Session Initiation Protocol. pp. 1-269.

* cited by examiner

*Primary Examiner*—Steven Nguyen
(74) *Attorney, Agent, or Firm*—Hollingsworth & Funk, LLC

(57) ABSTRACT

A system, apparatus and method for releasing sessions via network entities associated with the session, where the network entities include at least session endpoints and intermediary network entities. Network entities are subscribed to intermediary network entities serving as notifiers. Upon releasing the communication session at a first notifier, a session release notification is initiated from the first notifier to its respective subscriber. The session release notification is logically advanced towards a remote one of the session endpoints via the intermediary network entities. The communication session is terminated at each of the network entities receiving the session release notification.

33 Claims, 9 Drawing Sheets

SYSTEM AND METHOD FOR RELEASING SESSIONS AT NETWORK ENTITIES ASSOCIATED WITH THE SESSIONS

FIELD OF THE INVENTION

This invention relates in general to network communications, and more particularly to a system, method and apparatus for facilitating network-based releasing of sessions and clearing of communication session states.

BACKGROUND OF THE INVENTION

Communications between networked devices can be effected in a variety of ways. Users can communicate with one another via voice connections; users can browse content on other systems or devices; messages can be sent using services such as Short Messaging Service (SMS) or Multimedia Messaging Service (MMS); messages may be e-mailed; and so forth. Some communications, such as SMS/MMS messaging and e-mail, may not involve real-time communication between the end users. Other communications involve an actual or logical connection between the communicating parties. A "session" generally refers to a logical connection between computers or other devices and the communications exchanged between those devices while they are connected. A multimedia session involves a set of multimedia senders and receivers and the data streams flowing therebetween.

Network architectures exist that facilitate real-time services in operator networks. For example, the 3rd Generation Partnership Project (3GPP) IP Multimedia core network Subsystem (IMS) is an architecture for supporting multimedia services via a Session Initiation Protocol (SIP) infrastructure. The IMS includes a set of SIP proxies, servers, and registrars. These entities, referred to as Call Session Control Function (CSCF), include Proxy CSCFs (P-CSCF) and Serving CSCFs (S-SCSF). The P-CSCF is the first contact point within the IMS for a subscriber/endpoint, often referred to as User Equipment (UE), or User Agents (UA). Two such P-CSCF SIP proxies are used in the SIP signaling. For example, a first P-CSCF-A may represent the SIP proxy to which the mobile station (MS) of User A is attached, and a second P-CSCF-B may represent the SIP proxy to which the MS of User B is attached. The S-CSCF performs the session control, registration, and other services for the subscriber, such that a first S-CSCF-A provides services for User A in User A's home network, and a second S-CSCF-B provides services for User B in User B's home network.

The 3GPP IMS utilizes SIP in order to achieve a wide range of functionality with the network. SIP, defined by the Internet Engineering Task Force (IETF), is an end-to-end signaling protocol that facilitates (among other things) the establishment, handling and release of end-to-end multimedia sessions. It can be used in applications such as Internet conferencing, telephony, presence, events notification, instant messaging, and the like. SIP enables network endpoints or "User Agents" (UA) to discover one another and to agree on a session characterization. User agents (UA) refer to the network endpoints that initiate SIP requests to establish media sessions, and to transmit/receive information. In order to locate other users, SIP utilizes an infrastructure of network proxy servers such as the P-CSCF and S-CSCF to which users can send registrations, invitations to sessions, and other requests via their terminals. SIP supports various aspects of establishing and terminating sessions, such as user availability, session setup such as ringing, session management, and some limited terminal capabilities.

SIP, being an end-to-end signaling protocol, allows only endpoints (UE/UA) to generate messages. Intermediary network elements, such as the SIP proxies, are therefore unable to change or terminate ongoing SIP sessions. However, SIP provides services in operator-owned networks, and the operator wants to have full control over the ongoing sessions in its network. The inability for the operator to release an ongoing session may be problematic. For example, a mobile user may leave the radio coverage area; the user may no longer be trusted or authenticated; the user's pre-paid card may exhaust its remaining balance; or the like. While an IMS or similar network may be able to release the ongoing media sessions at the bearer level (e.g., via the Go Interface between P-CSCF/PDF and a GGSN), network entities such as the P-CSCF and S-CSCF are unable to clear the call states in the other network entities and the remote UE at the signaling level.

One solution to this problem could be to allow the releasing entity to send a message, such as a REFER message, to one of the UEs. A SIP REFER message is described, for example, in IETF RFC 3515, entitled "The Session Initiation Protocol (SIP) Refer Method," by R. Sparks. The REFER method indicates that the recipient (identified by the Request-URI) should contact a third party using the contact information provided in the request. Allowing the releasing entity to send a REFER message to one of the UEs would force the UE to send a BYE request to release the session. However, because the SIP stack in a UE is typically implemented via an application or other software, it can easily be modified by the owner of the UE, and therefore is not a reliable solution.

Further, in 3GPP IMS Release 5, the proxies (e.g., P-CSCF, S-CSCF) are allowed to generate and send BYE messages when the need for session release occurs. This solution, however, is not consistent with IETF SIP, and violates security for example. Also, this solution can only work in 3GPP IMS, as certain restrictions and architectural constraints apply.

Accordingly, there is a need in the communications industry for a manner of releasing sessions and call states in network entities at the signaling level. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for releasing signaling level sessions via network entities associated with the session.

In accordance with one embodiment of the invention, a method is provided for releasing a communication session involving network entities, where the network entities including session endpoints and intermediary network entities. One or more of the network entities are subscribed to one or more of the intermediary network entities serving as notifiers. Upon releasing the communication session at a first notifier, a session release notification is initiated via a signaling protocol from the first notifier to its respective subscriber. The session release notification is logically advanced (e.g., according to the logical connection path and not necessarily according to a physical path) towards a remote one of the session endpoints via the intermediary network entities. The communication session is terminated at each of the network entities receiving the session release notification.

In accordance with another embodiment of the invention, a method is provided for releasing a dialog established over an IP Multimedia core network Subsystem (IMS) that supports services via the Session Initiation Protocol (SIP), where the IMS includes a plurality of Call Session Control Functions (CSCFs) including at least a Proxy CSCF (P-CSCF) and an S-CSCF associated with each User Equipment (UE) involved in the dialog. The dialog is initiated from one UE towards another UE. Each P-CSCF associated with the dialog is subscribed to its respective S-CSCF, and each of the UEs is subscribed to the P-CSCF associated with the other UE. A SIP session release notification is generated at one of the CSCFs associated with a release of the dialog, and the SIP session release notification is transmitted towards its subscriber. The dialog state is released at the remaining CSCFs as a result of the generation and transmission of the SIP session release notification.

According to more particular embodiments, such a method further includes releasing the dialog state at one or both of the UEs as a result of the generation and transmission of the SIP session release notification. In another particular embodiment, the CSCF associated with the release of the dialog includes a first S-CSCF, and where generating a SIP session release notification at the first S-CSCF involves generating a SIP NOTIFY message and transmitting it towards a corresponding first P-CSCF that subscribed to the first S-CSCF. In a more particular embodiment, releasing the dialog state at the remaining CSCFs involves generating a second SIP NOTIFY message at the first P-CSCF, transmitting the second SIP NOTIFY message towards the UE that subscribed to the first P-CSCF, and releasing the dialog state at the remaining S-CSCFs and P-CSCFs in a path from the first P-CSCF towards the UE that subscribed to the first P-CSCF. In a more particular embodiment, releasing the dialog state at the remaining S-CSCFs and P-CSCFs includes treating the second SIP NOTIFY message as a SIP BYE at each of the remaining S-CSCFs and P-CSCFs. In another particular embodiment, the method further includes receiving the second SIP NOTIFY message at the UE that subscribed to the first P-CSCF, and transmitting a SIP BYE message from the UE that subscribed to the first P-CSCF towards the other UE.

According to other particular embodiments of such a method, the CSCF associated with the release of the dialog includes a first P-CSCF, and where generating a SIP session release notification at the first P-CSCF involves generating a SIP NOTIFY message and transmitting the SIP NOTIFY message towards the UE that subscribed to the first P-CSCF. In a more particular embodiment, releasing the dialog state at the remaining CSCFs involves releasing the dialog state at the remaining S-CSCFs and P-CSCFs in a path from the first P-CSCF towards the UE that subscribed to the first P-CSCF. In another more particular embodiment, the method includes receiving the SIP NOTIFY message at the UE that subscribed to the first P-CSCF, and transmitting a SIP BYE message from the UE that subscribed to the first P-CSCF towards the other UE. In still more particular embodiments, the method includes releasing the dialog state at the UE receiving the SIP BYE message. In other particular embodiments, releasing the dialog state at the remaining S-CSCFs and P-CSCFs involves treating the second SIP NOTIFY message as a SIP BYE at each of the remaining S-CSCFs and P-CSCFs.

In accordance with another embodiment of the invention, an S-CSCF operable in an IMS is provided, where the IMS includes at least a P-CSCF coupled to communicate with the S-CSCF. The S-CSCF includes a processor, and various processing modules operable with the processor. The processing modules may be implemented in software, firmware, or the like, and are operable via the processor. A release recognition module is configured to determine whether a session should be released at the S-CSCF. A subscription management module is configured to receive a subscription to a session release notification from the P-CSCF, where the session release notification includes a directive for the P-CSCF to release the session at the P-CSCF. A notification module is configured to generate the session release notification for transmission to the P-CSCF in response to the session being released at the S-CSCF.

In more particular embodiments of the S-CSCF, a notification management module is configured to receive and parse second session release notifications originating at other S-CSCFs or P-CSCFs associated with the session, and to identify an indication to release the session at the S-CSCF. In another particular embodiment, the S-CSCF includes a session termination module configured to receive the indication to release the session at the S-CSCF, and in response, to release the session at the S-CSCF. In still another embodiment, the session release notification further includes a second directive for the P-CSCF to terminate the subscription.

In accordance with another embodiment of the invention, a P-CSCF operable in an IP Multimedia core network Subsystem (IMS) is provided, where the IMS includes at least an S-CSCF coupled to communicate with the P-CSCF. The P-CSCF includes a processor operable with various processing modules. A release recognition module is configured to determine whether a session should be released at the P-CSCF. A subscription management module is configured to receive a subscription to a session release notification from a User Equipment (UE), where the session release notification includes a directive for the UE to release the session at the UE. A notification module is configured to generate the session release notification for transmission to the UE in response to the session being released at the P-CSCF.

In more particular embodiments of the P-CSCF, a subscription module is configured to issue to the S-CSCF a subscription request for session release notifications originating at the S-CSCF. In another embodiment, a notification management module is configured to receive and parse the session release notifications originating at the S-CSCF, and to identify an indication to release the session at the P-CSCF. In still another particular embodiment, a session termination module is configured to receive the indication to release the session at the P-CSCF, and in response, to release the session at the P-CSCF.

In accordance with another embodiment of the invention, a system for communicating over an IP Multimedia core network Subsystem (IMS) is provided. The system includes first and second User Equipments (UE) configured to engage in a dialog over the IMS, and a plurality of Call Session Control Functions (CSCF) associated with the IMS. The CSCFs include first and second Serving CSCFs (S-CSCF) and first and second Proxy CSCFs (P-CSCF). The first and second P-CSCFs serve as first points of communication within the IMS for the first and second UEs respectively, and are coupled to communicate with at least the first and second S-CSCFs respectively. The first and second P-CSCFs are configured to subscribe to the first and second S-CSCFs respectively, and the first and second UEs are configured to subscribe to the second and first P-CSCFs respectively. Each of the CSCFs includes a release recognition module configured to identify a release of the dialog, and a notification module to generate a release notification for transmission towards its respective subscriber. Each of the UEs and CSCFs include a session release module configured to release the dialog in response to receiving the release notification.

In accordance with another embodiment of the invention, a computer-readable medium is provided, having instructions stored thereon which are executable by a Call Session Control Function (CSCF) computer system for releasing a dialog established over an IP Multimedia core network Subsystem (IMS). Such instructions stored on the medium may be made available to the CSCF computer system in various manners, such as the CSCF computer system having a media drive mechanism(s) to read the computer-readable medium, or by transmitting the instructions from the medium to the CSCF computer system over a network, link, or other communication interface. The instructions executable by the CSCF computer system perform steps including determining whether a session should be released at the CSCF, and accepting a subscription to a session release notifications from a User Equipment (UE). The session release notification includes a directive for the UE to release the session at the UE. The instructions further perform steps including generating the session release notification for transmission to the UE in response to the session being released at the CSCF.

In accordance with another embodiment of the invention, a first network entity is provided that is operable in a signaling network, where the signaling network includes at least a second network entity coupled to communicate with the first network entity. The first network entity includes a processor, and a release recognition module operable with the processor to determine whether a session should be released at the first network entity. The first network entity also includes a subscription management module operable with the processor to receive a subscription to a session release notification from the second network entity. The session release notification includes a directive for the second network entity to release the session at the second network entity. A notification module operable with the processor is provided to generate the session release notification for transmission to the second network entity in response to the session being released at the first network entity.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner for releasing network communication sessions at network entities involved in the session. The present invention is particularly useful where an end-to-end signaling protocol is utilized that does not otherwise facilitate changes to, or termination of, the session via intermediary network entities of the session. Therefore, while an end-to-end signaling protocol such as SIP may be used to change or terminate sessions via the session endpoints, such a signaling protocol does not account for release (or change) of an ongoing session from an intermediary network entity, such as a proxy(s) or other server(s) in the operator network. The present invention provides a manner by which such intermediary network entities may release the session, by having various network entities involved in the session subscribe to other network entities involved in the session, notifying the subscribers of the release, and treating such a release at the subscribing network entities as a session termination request in conformance with the implemented signaling protocol.

Figure 1:
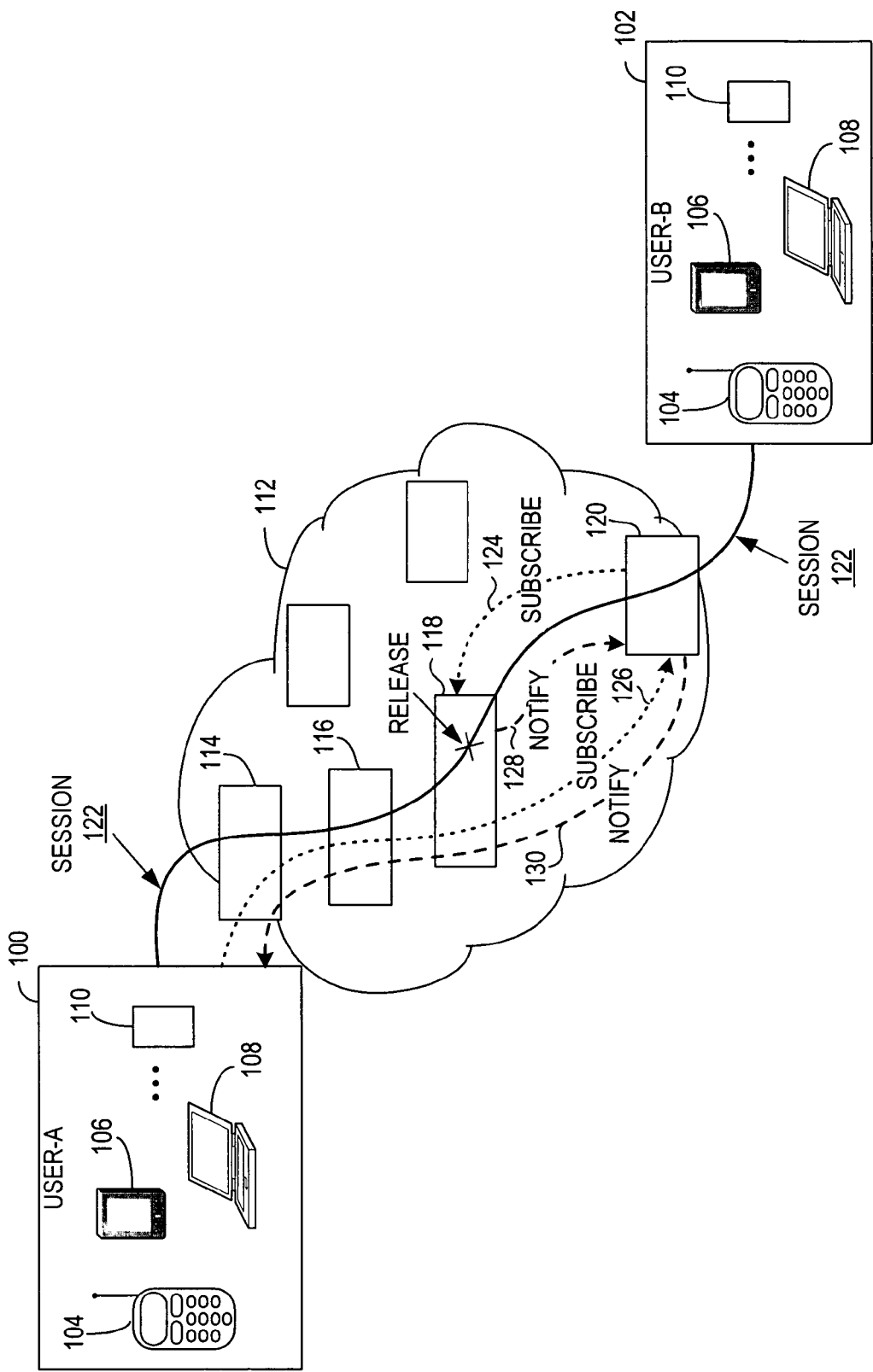
FIG. 1 is a block diagram illustrating one embodiment of a system for releasing sessions in accordance with the present invention.

FIG. 1 is a block diagram illustrating one embodiment of a system for releasing sessions in accordance with the present invention. In the embodiment of FIG. 1, a first user, User-A 100, may want to establish a communication session with another user, such as User-B 102. User-A 100 and User-B 102 may utilize any wireless or landline communication device, such as a mobile phone 104, Personal Digital Assistant 106, wireless or landline computing system 108, or other communication device 110 that is compliant with the communication and signaling protocols employed. For example, where SIP is used as the signaling protocol, any SIP-compliant device 100, 102 may be used.

Communication between the users 100, 102 occurs over a network 112. The network may include one or more interworking wireless or landline networks, including cellular networks (e.g., GSM, UMTS), data networks such as GPRS and the Internet, network subsystems such as IMS, and so forth. Signaling may be utilized to, among other things, establish a session between the users 100, 102. Various network entities in addition to the endpoints 100, 102 may be involved in the session, such as network entities 114, 116, 118, 120, etc. In accordance with the invention, various "subscriptions" are effected during call establishment. For example, network entities involved in a particular session 122 (often referred to as a "call leg" or "dialog" in SIP transactions) subscribe to receive notifications of a release of the session. For example, network entity 120 may subscribe 124 to receive such notifications from network entity 118, and the user equipment associated with User-A 100 may subscribe 126 to network entity 120. It should be noted that additional subscriptions may also take place, but are not shown in FIG. 1 for ease of description.

The subscriptions allow the subscribing entity ("subscriber") to subsequently receive a notification of a termination of the session, so that the subscriber can release the session, even though a signaling protocol is used that does not otherwise provide for such a release notification. For example, where SIP or another end-to-end signaling protocol is used, an endpoint 100, 102 may initiate a release of the session. However, the network may need to release the session rather than an endpoint. This may arise, for example, where a user 100, 102 of the session moves out of radio coverage, is no longer trusted or authenticated, employs a pre-paid mechanism that has exhausted its available assets, etc. In such case, a network entity such as network entity 118 may release the session. However, the fact that such a release has occurred needs to be relayed to the network entities involved in the session (including the endpoints), else the call states in the other network entities will not be cleared.

For example, if network entity 118 releases a call session for any reason, it will notify its subscribers of this fact. The subscriber to network entity 118 as illustrated in FIG. 1 is the network entity 120, which is notified 128 of the release by network entity 118. Network element 120 receives this notification, clears its call states for that session 122, and notifies 130 its subscribers 100 of the release. The subscriber to network entity 120 as illustrated in FIG. 1 is the user equipment for User-A 100, which is notified 130 of the release. The user equipment for User-A 100 receives this notification, and clears its call states for that session 122. Further, the session termination notification 130 is recognized by other network entities, such as network entities 114, 116, 118, that terminate their respective call states in response to the notification. In accordance with one embodiment of the invention, the user equipment for User-A 100 can then send a session termination message as supported by the end-to-end signaling protocol (e.g., a BYE message using SIP), towards the other user equipment 102 involved in the session to notify it of the release.

Figure 2:
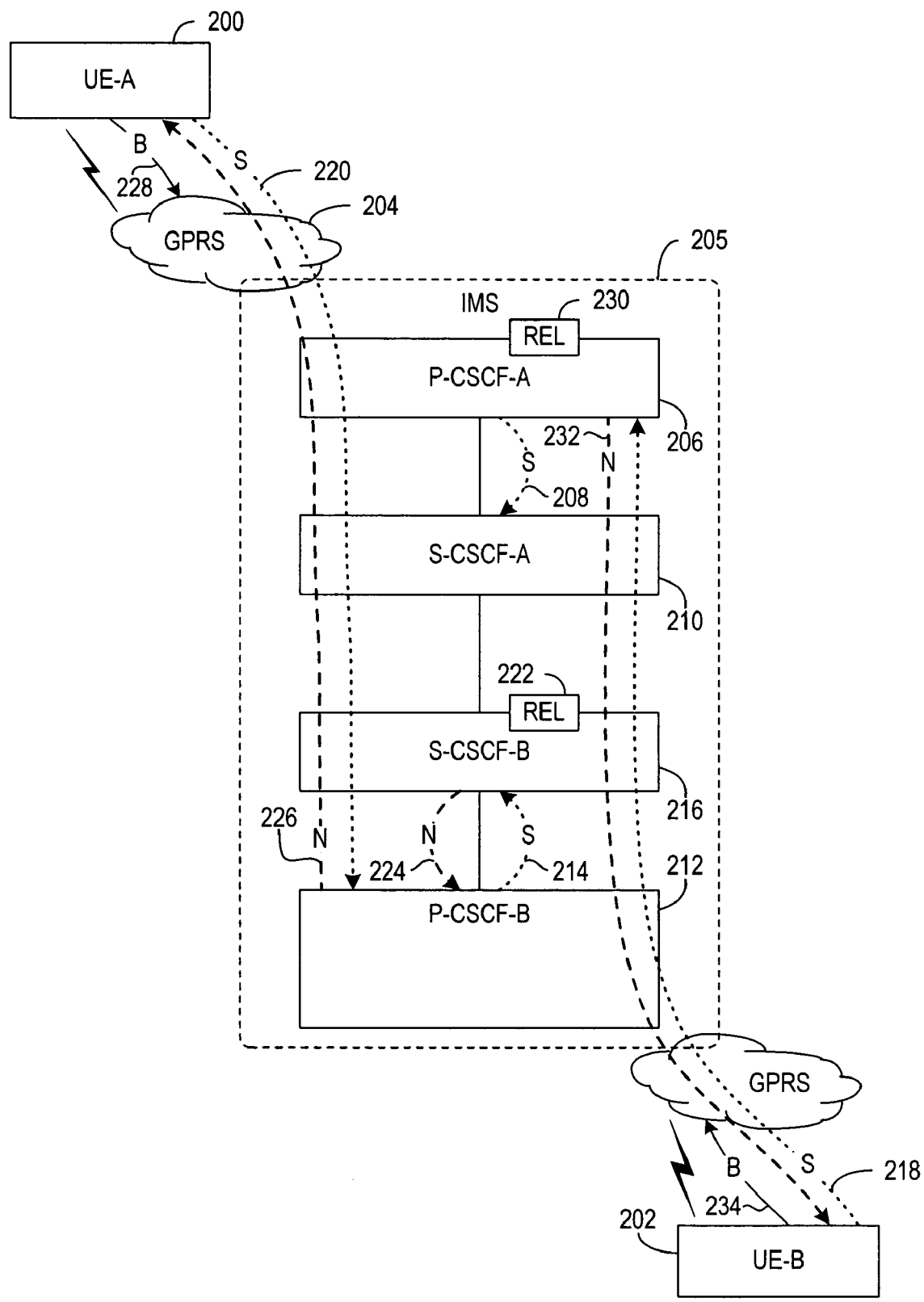
FIG. 2 is a block diagram illustrating a more particular embodiment of a system for releasing sessions in an IMS environment in accordance with the present invention.

FIG. 2 is a block diagram illustrating a more particular embodiment of a system for releasing sessions in accordance with the present invention. For purposes of illustration, the embodiment of FIG. 2 is described in terms of General Packet Radio Service (GPRS) networks and the IP Multimedia Subsystem (IMS). For purposes of this description, GRPS and IMS are used as representative network architectures in which the principles of the present invention may be employed. However, as will be readily apparent to those skilled in the art from the description provided herein, the present invention is applicable in other current or future network environments.

To facilitate an understanding of the embodiment illustrated in FIG. 2, a brief description is provided of the GPRS and IMS network environments. GPRS is a packet-switched wireless communication standard for Global System for Mobile Communications (GSM) that mirrors the Internet model and enables seamless transition towards 3G networks. GPRS provides actual packet radio access for mobile GSM and time-division multiple access (TDMA) users. With respect to IMS, the Third Generation Partnership Project (3GPP) has standardized the Universal Mobile Telecommunications System (UMTS) in various phases, where Release 5 included a system where the packet-switched core network (PS-CN) dominates over circuit-switched, and further took responsibility of telephony services. Release 5 introduced a new core network into the UMTS architecture, namely the IP Multimedia Subsystem (IMS) core that supports both telephony and multimedia services. The IMS interacts both with the Public Switched Telephone Network (PSTN) and the Internet (or other such large-scale network) to provide various multimedia services to users. Signaling in IMS is generally performed using SIP, and FIG. 2 is described in generic terms of a SIP-enabled network (or analogous protocol), which sets forth network elements such as proxy servers, registrars, and the like. In IMS, these generic network elements are more particularly named and defined, and the present invention is equally applicable to IMS-based communication. For example, a SIP proxy is identified as a Call State Control Function (CSCF), of which various types exist, including a proxy CSCF (P-CSCF), a serving CSCF (S-CSCF), and interrogating CSCF (I-CSCF). Generally, an S-CSCF performs and/or assists in performing a number of functions, including controlling session management functions for the IMS, providing access to home network servers such as location services, authentication, etc. A P-CSCF generally serves as the point of contact for applications (such as the mobile terminal client applications), and performs and/or assists in performing functions such as translation, security, authorization, etc. An I-CSCF generally serves as a point of contact in the home network for connections destined to a subscriber of that home network or roaming subscribers currently located within that network's service area. It may perform a number of functions, such as assigning an S-CSCF to a user performing registration, contacting the Home Subscriber Server (HSS) to obtain the S-CSCF address, forwarding SIP requests/responses to the S-CSCF, etc. For purposes of the description of FIG. 2, the P-CSCF and S-CSCF are relevant.

It is also noted that for the embodiment described in connection with FIG. 2, it is assumed that the P-CSCFs, S-CSCFs, and User Equipments (UEs) support various SIP extensions, event packages, and/or other conditions. For example, in one embodiment of the invention, all P-CSCFs, S-CSCFs, and UEs support an event package for dialog state such as set forth in IETF Internet Draft "A Session Initiation Protocol (SIP) Event Package for Dialog State," as well as IETF RFC 3265 entitled "Session Initiation Protocol (SIP)-Specific Event Notification." Further, in one embodiment, all P-CSCFs and S-CSCFs are call stateful such that they can act as notifiers for the dialog state. This is described more fully below.

The present invention may utilize any event notification methodology to allow the relevant network entities (e.g., UEs, SIP servers, etc.) to request notification from remote nodes indicating that a certain event(s) has occurred. In accordance with one embodiment of the invention, such an event notification methodology may be implemented in accordance with IETF RFC 3265, entitled "Session Initiation Protocol (SIP)-Specific Event Notification," by A. B. Roach (hereinafter referred to as RFC 3265). RFC 3265 describes a framework by which notification of desired events can be ordered. Entities in the network can subscribe to resource or call state for various resources or calls in the network, and those entities (or entities acting on their behalf) can send notifications when those states change.

In accordance with RFC 3265, notifications can be provided from one network entity to another, where one of the network entities serves as a "notifier" vis-à-vis the other network entity that represents the "subscriber." Thus, a network entity such as a SIP proxy may represent a notifier with respect to one network entity, and may represent a subscriber with respect to another network entity. A subscriber can initiate a state subscription request, such as via the SUBSCRIBE method provided by SIP, to another network entity serving as a notifier for that particular subscription. The notifier may acknowledge a successful subscription by providing an appropriate response to the subscriber, such as via a 2xx response code (e.g., 200 response). A 200 response would indicate that the subscription has been accepted and that the user is authorized to subscribe to the requested resource. When desired state information changes and is recognized by the notifier, the notifier can return current state information via a notification message, such as via SIP's NOTIFY method. The subscriber may respond to the notification message with an acknowledgment code, such as a SIP 200 response.

In accordance with the invention, a subscription may exist for any desired time. In accordance with one embodiment conforming to RFC 3265, subscription requests may include an "expires" header that contains an expiration value indicating the duration of the subscription. If no such expiration value is provided, a default subscription duration may apply. Subscribers may refresh their subscriptions using a new subscription request on the same dialog. Subscribers may also unsubscribe to the notifier, such as by providing a zero or null expiration value in the expires header in the RFC 3265 context.

An embodiment of the invention employing RFC 3265 may involve identification of events by providing at least a Request URI, Event Type, and optionally a message body. More particularly, the Request URI of a SUBSCRIBE request includes enough information to route the request to the appropriate entity, and also includes enough information to identify the resource for which event notification is desired. In the subscription request, subscribers include an indication of which event or class of events to which they are subscribing, such as through the use of an "Event" header in the subscription (e.g., SUBSCRIBE) request. Such an Event header will include information indicating the type of state for which a subscription is being requested, where this information may be registered with the Internet Assigned Numbers Authority (IANA) and will correspond to an event package that further describes the semantics of the event or event class.

A "dialog" (also referred to as a "call leg") refers to a peer-to-peer SIP relationship between two UAs that persists for some time. The dialog facilitates sequencing of messages and proper routing of requests between the UAs. For example, a dialog can be initiated using a SIP INVITE method. The dialog is established by SIP messages, such as a 2xx response to the INVITE request. Generally, a dialog is identified at each UA with a dialog ID, which includes a call identifier, local tag, and a remote tag. The dialog ID at each UA involved in the dialog is not the same, as the local tag at one UA is the same as the remote tag at the peer UA. Other SIP methods, such as the SUBSCRIBE method, are also dialog-creating methods.

The state information provided by a notifier may be identified in advance, such that specific state information available to the notifier is provided to the subscriber. In one embodiment, the state information provided by a notifier may be provided by way of an "event package." An event package defines a set of state information to be reported by a notifier to a subscriber. In accordance with one embodiment of the invention, the relevant network entities support an event package for a dialog state, such as that described in IETF Internet Drafts "A Session Initiation Protocol (SIP) Event for Dialog State" (draft-ietf-sipping-dialog-package-00.txt) and/or "An INVITE Inititiated [sic] Dialog Event Package for the Session Initiation Protocol (SIP)" (draft-ietf-sipping-dialog-package-02).

Referring now to FIG. 2, a first UE, UE-A 200, may send a SIP INVITE request targeted for another UE, shown as UE-B 202. As is known by those skilled in the art, an INVITE is a SIP method that is used for session setup. The INVITE request generally includes a Request URI that identifies the destination address of the request, i.e., UE-B 202 in the present example. The INVITE may traverse the GPRS 204 or other similar network associated with the UE-A 200, where the GPRS 204 may communicate with an IMS network 205 by way of, for example, a Gateway GPRS Support Node (GGSN; not shown). Upon receipt of an initial INVITE request, the P-CSCF supporting UE-A 200, namely P-CSCF-A 206, subscribes 208 to the Dialog State for the INVITE dialog at S-CSCF-A 210. The P-CSCF-A 206 may obtain the address of the S-CSCF-A 210 from the Route header in the initial INVITE request or other analogous header. The P-CSCF-B 212 subscribes 214 to the Dialog State for the INVITE dialog at S-CSCF-B 216, the address of which it may obtain from the received Record-Route header or other analogous header. UE-B 202 subscribes 218 to the Dialog State for the INVITE dialog at P-CSCF-A 206 which serves as the outbound proxy of UE-A 200. UE-B 202 may obtain the address of P-CSCF-A 206 from the received Record-Route header or other analogous header. Upon receipt of a 1xx/2xx response code (other than a 100 "Trying" response code) to the initial INVITE request, UE-A 200 subscribes 220 to the Dialog State for the INVITE dialog at P-CSCF-B 212 which serves as the outbound proxy of UE-B 202. UE-B 202 may obtain the address of P-CSCF-B 212 from the received Record-Route header or other analogous header. At this point, the network entities involved in the dialog are subscribed to receive notifications from the relevant network entities, such that the call state may be cleared in accordance with the present invention upon a non-endpoint release of the dialog. It is noted that the subscriptions to the Dialog State package shall generate different dialogs than the dialog generated by the INVITE-1xx/2xx dialog, as the subscribe dialogs do not cover the same complete route as the INVITE-1xx/2xx dialog.

According to one embodiment of the invention, if one of the P-CSCFs becomes aware of the fact that the attached UE is not subscribing to the remote P-CSCF (e.g., a non-compliant UE), the P-CSCF will subscribe itself to the remote P-CSCF. This guarantees that at least the call states in the non-endpoint network elements (CSCFs) will get cleared. The UE that did not subscribe will not, in such a scenario, be updated with the correct call state.

As previously indicated, the present invention allows for the clearing of call states in the relevant network entities where the release occurs at a network entity intermediate to the session endpoints. For example, an S-CSCFs 210, 216 may release an INVITE dialog. An S-CSCF may perform such a release when, for example, the user's pre-paid card/account has expended its available balance. FIG. 2 illustrates an example of such a release (REL) 222 performed by S-CSCF-B 216. When this occurs, the S-CSCF-B 216 generates a NOTIFY 224 for the Call State package. As is known in the art, a NOTIFY request is a SIP method that effects a transport of a subscribed event notification. In accordance with the invention, the NOTIFY includes the state indication "terminated" (or other appropriate dialog termination indicator) for the related dialog. The NOTIFY also includes the subscription state header with the value "terminated" (or other appropriate dialog termination indicator), in order to terminate the subscription. The S-CSCF-B 216 sends the NOTIFY 224 towards its subscriber, which is the P-CSCF-B 212 to which UE-B 202 (that the S-CSCF-B 216 serves) is attached to. Analogously, the S-CSCF-A 210 would send such a NOTIFY to P-CSCF-A 206 had the release occurred at S-CSCF-A 210.

When the P-CSCF-B 212 receives the NOTIFY for the Dialog State package (which is addressed to it by the S-CSCF-B 216 that serves its attached user UE-B 202), and the NOTIFY includes the "terminated" (or analogous indication) state indication for the related dialog, the P-CSCF-B 212 will generate a NOTIFY 226 for the Call State package that includes the state indication "terminated" (or other appropriate dialog termination indicator) for the related dialog and the subscription state header with the value "terminated" (or other appropriate dialog termination indicator), in order to terminate the subscription. The P-CSCF-B 212 will send the NOTIFY 226 towards its subscriber, which is the remote UE-A 200 in the illustrated example. Alternatively, in the case where UE-A 200 is a non-compliant device that did not originally subscribe 220 to the P-CSCF-B 212, then the remote P-CSCF (P-CSCF-A 206) would be the subscriber to P-CSCF-B 212, and the NOTIFY 226 would be directed to P-CSCF-A 206.

The P-CSCF-B 212 treats the received NOTIFY 224 as a session termination request; in the case of SIP, the NOTIFY 224 will be treated as if a BYE message had been received for the indicated INVITE dialog. In this manner, the P-CSCF-B 212 will release the call states in response to receiving the NOTIFY 224 from its notifier S-CSCF-B 216, and will also release all information and resources related to the subscription to the S-CSCF-B 216.

As indicated above, the P-CSCF-B 212 will send a NOTIFY 226 towards its subscriber, which is the remote UE-A 200 in the example of FIG. 2. One or more S-CSCFs may then receive such a NOTIFY message for the Dialog State package for a dialog it is involved in. This NOTIFY will not be addressed to the S-CSCF, but rather to one of the involved UEs or P-CSCFs. Whenever one of the S-CSCFs receives such a NOTIFY message for the Dialog State package for a dialog it is involved in, and this NOTIFY includes a state termination "terminated" (or analogous indication) for the related dialog, the S-CSCF will treat that NOTIFY as if a session termination request (e.g., SIP BYE message) for the related INVITE dialog has been received. For example, S-CSCF-A 210 will receive the NOTIFY 226 from the P-CSCF-B 212, and because this NOTIFY 226 will include a state indication "terminated" for the related dialog, S-CSCF-A 210 will treat that NOTIFY 226 as if a BYE message for the related INVITE dialog has been received. Thus, S-CSCF-A 210 will clear its call states for the related INVITE dialog.

The NOTIFY 226 is addressed to its subscriber, UE-A 200. The NOTIFY 226 received at the S-CSCF-A 210 therefore continues to the P-CSCF-A 206. All CSCFs through which the NOTIFY passes will act on that NOTIFY as if a SIP BYE message was received. Therefore, when the P-CSCF-A 206 receives the NOTIFY 226, it will release the call states in a manner analogous to that had a SIP BYE message been received at P-CSCF-A 206.

The NOTIFY 226 from the P-CSCF-B 212 notifier reaches its ultimate subscriber, the UE-A 200. The UE-A 200, upon receiving the NOTIFY 226 that indicates a related INVITE dialog as "terminated," responds with the appropriate SIP response code, such as 200 OK. In one embodiment of the invention, UE-A 200 treats the received NOTIFY 226 as a trigger to send a session termination message such as a SIP BYE (B) message 228 towards the other UE. The sending of a BYE 228 by the remote UE, UE-A 200 in this example, cannot be assured, as a UE generally cannot be trusted. This BYE request 228 may be sent simply to complete SIP transactions.

A session or dialog may be released by a P-CSCF as well. For example, a P-CSCF may release an INVITE dialog when its associated user leaves the radio coverage area. FIG. 2 also illustrates such a scenario, where P-CSCF-A 206 releases (REL) 230 the INVITE dialog, which may occur if UE-A 200 leaves the radio coverage area. In such case, P-CSCF-A 206 generates a NOTIFY 232 for the Call State package. The NOTIFY 232 includes the state indication "terminated" (or other appropriate dialog termination indicator) for the related dialog, as well as the subscription state header with the value "terminated" (or other appropriate dialog termination indicator), in order to terminate the subscription. P-CSCF-A 206 sends the NOTIFY 232 towards its subscriber, which is UE-B 202 in the illustrated example. Alternatively, where UE-B 202 is a non-compliant device that did not originally subscribe 218 to the P-CSCF-A 206, then the remote P-CSCF (P-CSCF-B 212) would be the subscriber to P-CSCF-A 206, and the NOTIFY 232 would be directed to P-CSCF-B 212. The P-CSCF-A 206 will clear its call states for the initial INVITE dialog.

Analogously to that previously described, the NOTIFY 232 will pass through other CSCFs such as S-CSCF-A 210, S-CSCF-B 216, and P-CSCF-B 212 on its way to the subscriber UE-B 202. All CSCFs through which the NOTIFY 232 passes will act on that NOTIFY 232 as if a SIP BYE message was received, thereby allowing those CSCFs to clear the call states for that INVITE dialog. The UE-B 202 shall, upon receipt of the NOTIFY 232 which indicates a related INVITE dialog as "terminated," respond with an appropriate response code (e.g., 200 OK), and treat the received NOTIFY 232 as a trigger to issue a BYE (B) message 234 towards UE-A 200.

To summarize some of the actions described in connection with FIG. 2, whenever one of the P-CSCFs either releases an INVITE dialog, or receives a NOTIFY for the Dialog State package that is either directly addressed to it or to the UE attached to it where the NOTIFY includes the state indication "terminated" for the related dialog and was generated by the S-CSCF serving its attached user, the P-CSCF shall take certain actions. These actions include generating a NOTIFY for the Call State package that includes the state indication "terminated" (or other appropriate indicator) for the related dialog, and includes subscription state information indicating "terminated" (or other appropriate indicator) in order to terminate the subscription. The P-CSCF will send the NOTIFY towards its subscriber, which is the remote UE or, in the case of a non-compliant UE, is the remote P-CSCF. The P-CSCF will treat the received NOTIFY as if a BYE message for the indicated INVITE dialog has been received. Afterwards, the P-CSCF shall release all information and resources related to the subscription to the S-CSCF.

With respect to S-CSCFs, whenever one of the S-CSCFs releases an INVITE dialog, it will generate a NOTIFY for the Call State package that includes the state indication "terminated" (or other appropriate indicator) for the related dialog, and includes subscription state information indicating "terminated" (or other appropriate indicator) in order to terminate the subscription. The S-CSCF will send the NOTIFY towards its subscriber—the P-CSCF to which the user, whom the S-CSCF serves, is attached to. Further, whenever one of the S-CSCFs receives a NOTIFY message for the Dialog State package for a dialog it is involved in, and this NOTIFY includes a state indication "terminated" for the related dialog, the S-CSCF will treat that NOTIFY as if a BYE message for the related INVITE dialog has been received.

Finally, the UE shall, upon receipt of a NOTIFY which indicates a related INVITE dialog as "terminated," send back a response such as a 200 OK, and treat the received NOTIFY as a trigger for a BYE messages towards the other UE.

While the description of FIG. 2 was generally described in terms of SIP signaling methodologies, it should be noted that the present invention is equally applicable to other current and/or future signaling protocols. SIP methods such as SUBSCRIBE, INVITE, and NOTIFY or the functionality provided by such SIP methods may be provided via other signaling protocols, and the present invention is equally applicable to such other signaling protocols.

Figure 3:
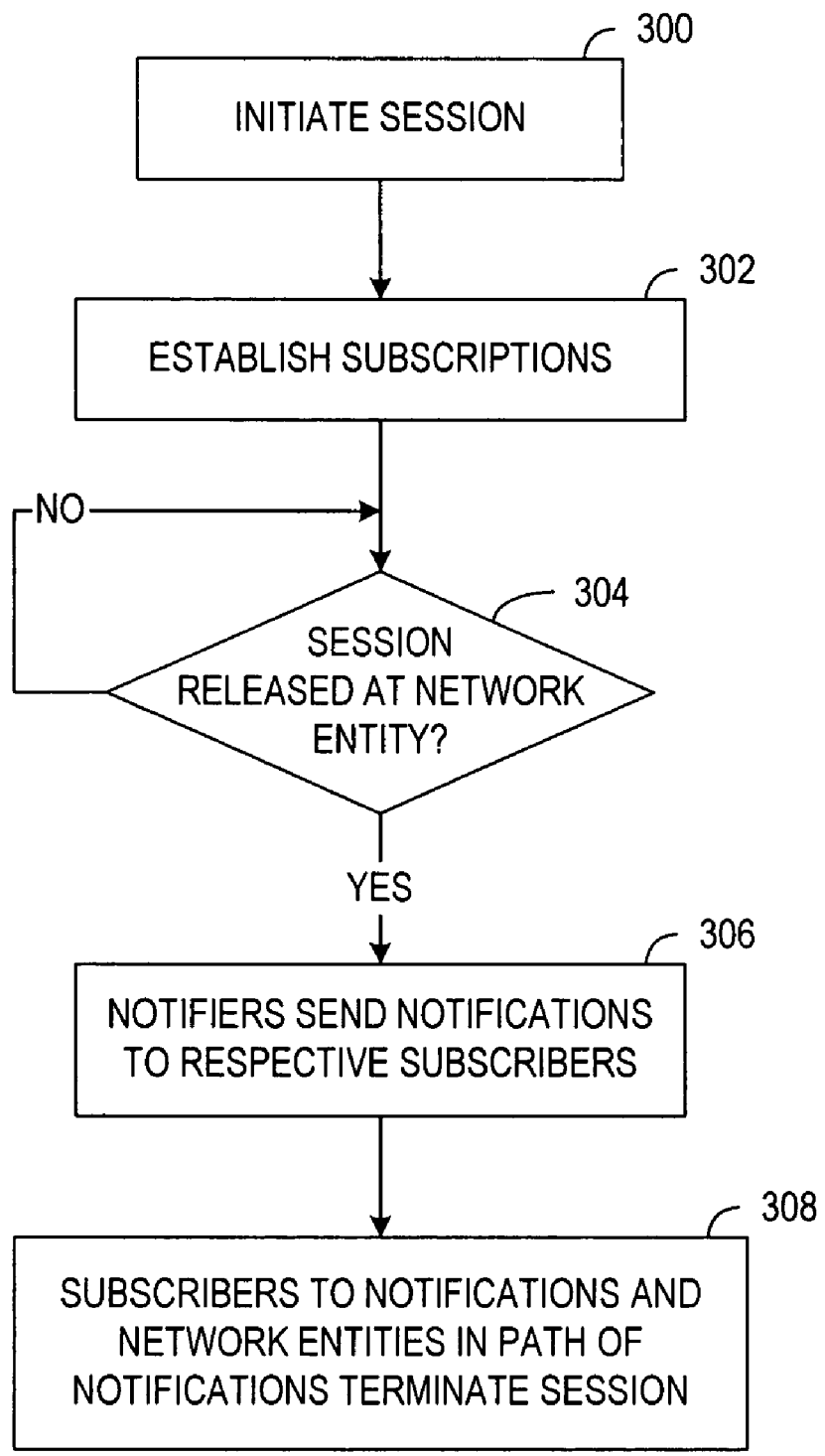
FIG. 3 is a flow diagram illustrating one embodiment of a method for releasing signaling level sessions in accordance with the present invention.

FIG. 3 is a flow diagram illustrating one embodiment of a method for releasing signaling level sessions in accordance with the present invention. A session is initiated 300. Assuming SIP as the signaling protocol, initiation of a session may involve an INVITE request issued from a session endpoint, such as a mobile phone, PDA, or other SIP-enabled computing device. Such an INVITE request is directed to a remote session endpoint, such as another mobile phone, PDA, or other SIP-enabled computing device.

Upon receipt of such an initial INVITE request or other manner of initiating 300 the session, various subscriptions are established 302 in accordance with the invention. Where the session involves network entities including the session endpoints as well as intermediary network entities, one or more of the network entities subscribe 302 to one or more of the intermediary network entities that therefore serve as notifiers. It should be recognized that an intermediary network entity may serve as both a subscriber and a notifier.

As a more particular example, one embodiment of the invention involves establishing 302 subscriptions in an IMS environment, where all P-CSCFs, S-CSCFs, and IMS UEs support the IETF "A Session Initiation Protocol (SIP) Event Package for Dialog State" and RFC 3265, and all P-CSCFs and S-CSCFs are call stateful so they can act as notifiers for the Dialog State. Upon receipt of an INVITE request, various CSCFs (intermediary entities) and UEs (endpoints) subscribe to certain CSCFs. More particularly, each P-CSCF may subscribe 302 to the Dialog State for the INVITE dialog at its corresponding S-CSCF, and each UE subscribes to the Dialog State for the INVITE dialog at the P-CSCF attached to the other UE of the dialog. Each P-CSCF and S-CSCF to which a subscription has been made may now act as a notifier in the sense of RFC 3265.

If the call/session gets released at one of these notifiers as determined at decision block 304, that notifier initiates a session release notification via the signaling protocol to its respective subscriber. For example, if a call is released at an S-CSCF, that S-CSCF will send 306 a NOTIFY to its subscriber, which is its corresponding P-CSCF. The NOTIFY will thereby indicate the release to the subscribing P-CSCF. In accordance with the invention, the session release notification (e.g., NOTIFY message) will be logically advanced towards the remote session endpoint via the intermediary network entities. If the subscriber of that NOTIFY is a P-CSCF, it will generate a new NOTIFY and send it towards its subscriber, which is the remote UE. Thus, the subscribers to the notifications, as well as the network entities in the path of the notifications, will terminate 308 the session. In one embodiment, the NOTIFY is treated at each P-CSCF and S-CSCF as if a SIP BYE message was received, which will terminate the session in order to clear the call states.

Figure 4:
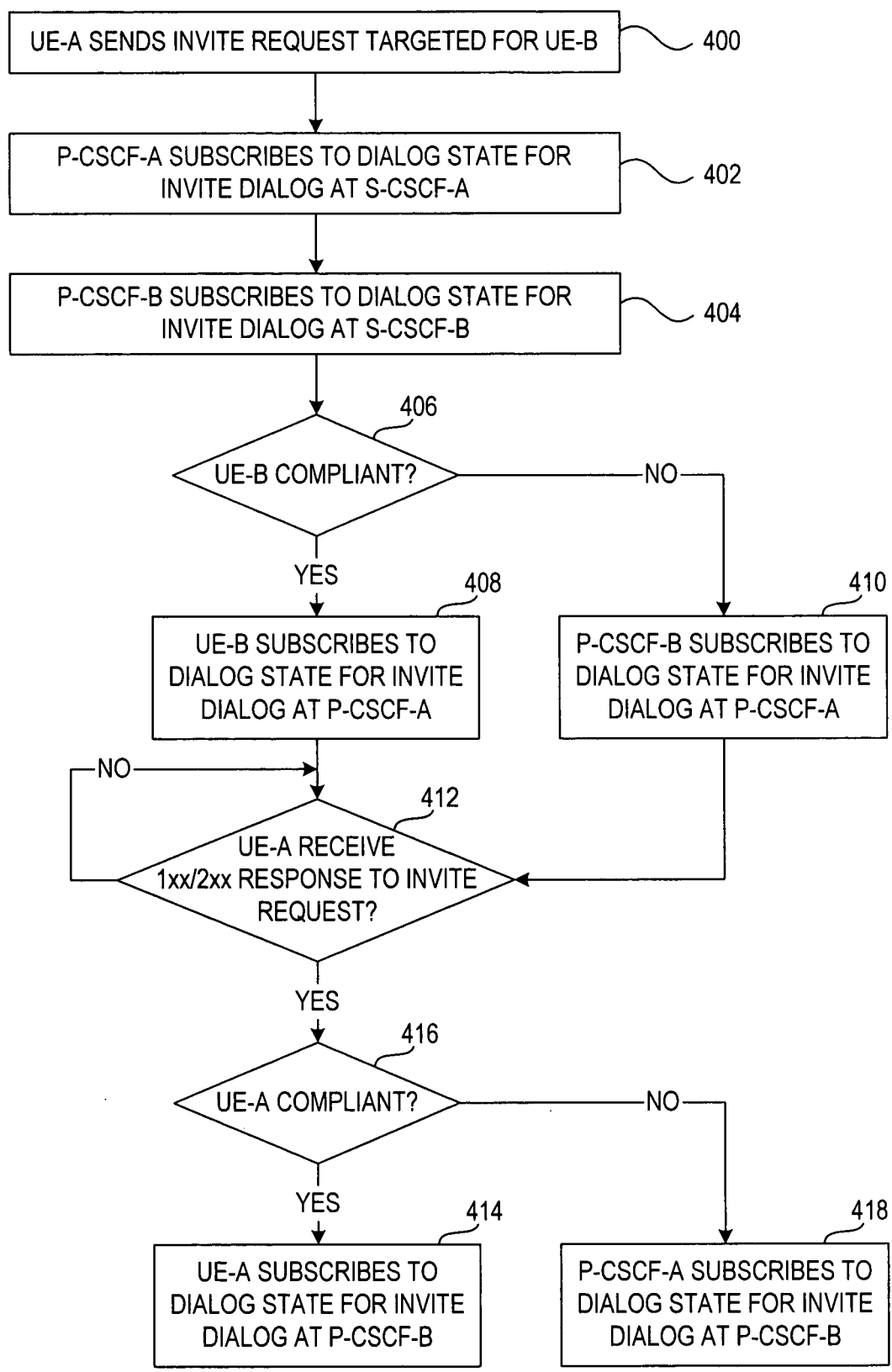
FIG. 4 is a flow diagram illustrating one manner of establishing subscriptions in an IMS environment in accordance with the invention.

FIG. 4 is a flow diagram illustrating one manner of establishing subscriptions in an IMS environment in accordance with the invention. For purposes of FIG. 4, it is assumed that P-CSCF-A represents the SIP proxy to which UE-A is attached to, P-CSCF-B represents the SIP proxy to which UE-B is attached to, S-CSCF-A represents the SIP proxy providing services for User A (i.e., UE-A) in User A's home network, and S-CSCF-B represents the SIP proxy providing services for User B (i.e., UE-B) in User B's home network.

During call establishment, such as upon receipt of an INVITE request, UE-A sends 400 an INVITE request targeted for UE-B. P-CSCF-A subscribes 402 to the Dialog State for the INVITE dialog at S-CSCF-A, and P-CSCF-B subscribes 404 to the Dialog State for the INVITE dialog as S-CSCF-B. If UE-B is a compliant device (e.g., supports the IETF "A Session Initiation Protocol (SIP) Event Package for Dialog State" and RFC 3265) as determined at decision block 406, then UE-B subscribes 408 to the Dialog State for the INVITE dialog at P-CSCF-A. If UE-B is non-compliant, P-CSCF-B may become aware of this and will subscribe 410 itself to the remote P-CSCF, which is P-CSCF-A in the present example. Upon receipt 412 of an appropriate response code such as 1xx/2xx responses (except, for example, 100 "Trying") to the initial INVITE request, the UE-A subscribes 414 to the Dialog State for the INVITE dialog at P-CSCF-B, assuming UE-A is compliant as determined at decision block 416. If UE-A is not compliant, then P-CSCF-A subscribes 418 to the Dialog State for the INVITE dialog at P-CSCF-B.

Figure 5:
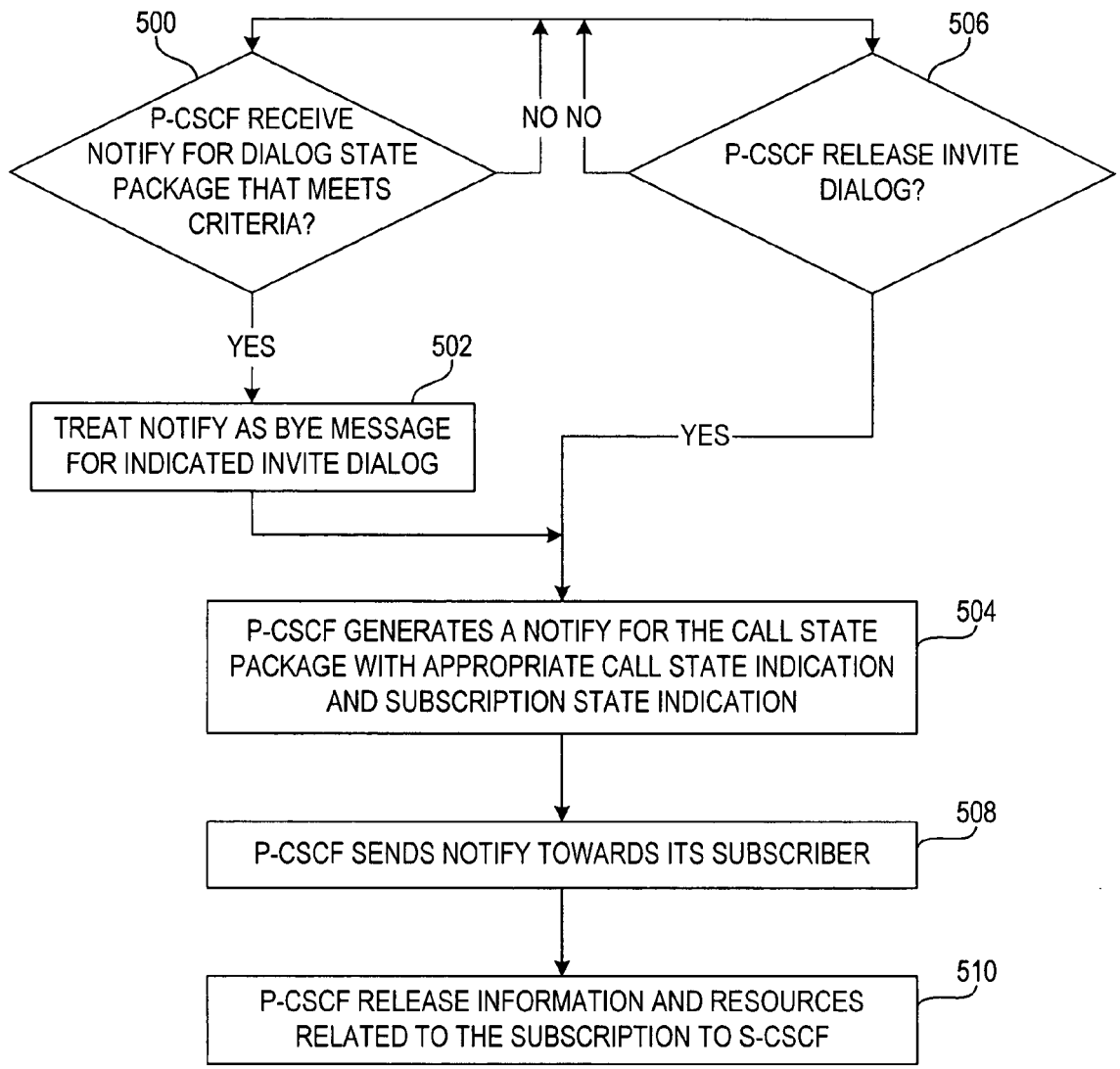
FIG. 5 is a flow diagram illustrating one embodiment in which P-CSCF notifiers issue notifications to their subscribers in accordance with the present invention.

Once subscriptions have been established, notifiers will notify their subscribers of a release of a call. FIG. 5 is a flow diagram illustrating one embodiment in which such notifications issued from a P-CSCF may be effected in accordance with the present invention. If a P-CSCF receives a session release notification such as a SIP NOTIFY for the Dialog State package that meets certain criteria as determined at decision block 500, the P-CSCF will treat 502 the notify as a BYE message for the indicated INVITE dialog. For example, if a P-CSCF receives a NOTIFY that was generated by the S-CSCF serving its attached user, and the NOTIFY is either directly addressed to it or is addressed to the UE attached to it and includes a state indication that the related dialog was released, then that P-CSCF will treat the NOTIFY as if a BYE message was received for that INVITE dialog. The P-CSCF will generate 504 a NOTIFY for the Call State package that includes the appropriate call state indication and subscription state indication. More particularly, the state indication will be set to "terminated" or other analogous indication for the related dialog, and the subscription state will be set to "terminated" or other analogous indication to terminate the subscription. Further, if a P-CSCF itself releases the INVITE dialog as determined at decision block 506, such a NOTIFY message will be generated 504.

When the NOTIFY message has been generated, the P-CSCF sends 508 the NOTIFY towards its subscriber. The subscriber will be the remote UE, or the remote P-CSCF where the remote UE is a non-compliant device and the remote P-CSCF was the subscribing entity rather than the remote UE. The P-CSCF shall then release 510 all information and resources related to the subscription to its associated S-CSCF.

Figure 6:
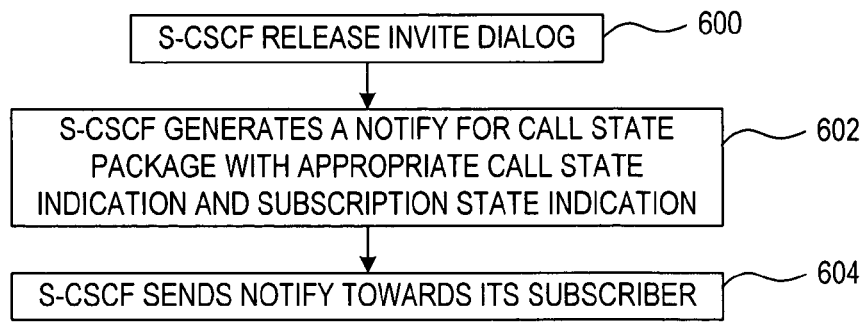
FIGS. 6 and 7 are flow diagrams illustrating embodiments in which notifications are issued from an S-CSCF to their subscribers in accordance with the present invention.
Figure 7:
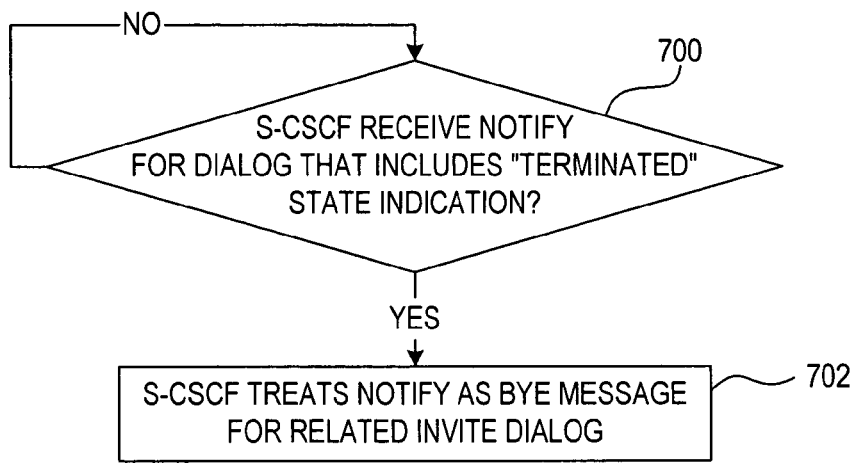

As indicated above, notifiers will notify their subscribers of a release of a call once subscriptions have been established. FIGS. 6 and 7 are flow diagrams illustrating various embodiments in which such notifications issued from a S-CSCF may be effected in accordance with the present invention. Whenever one of the S-CSCFs releases 600 an INVITE dialog, it will generate 602 a NOTIFY for the Call State package with the appropriate call state indication and subscription state indication. More particularly, the state indication will be set to "terminated" or other analogous indication for the related dialog, and the subscription state will be set to "terminated" or other analogous indication to terminate the subscription. The S-CSCF sends 604 the NOTIFY towards its subscriber. The subscriber in this example is the P-CSCF to which the user, whom the S-CSCF serves, is attached. When one of the S-CSCFs receives a NOTIFY message for the Dialog State package for a dialog it is involved in, and that NOTIFY includes a "terminated" state indication as determined at decision block 700 of FIG. 7, the S-CSCF will treat that NOTIFY as if a BYE message for the related INVITE dialog has been received as shown at block 702. It should be noted that such a NOTIFY will not be addressed to the S-CSCF, but rather to one of the involved UEs/P-CSCFs.

Figure 8:
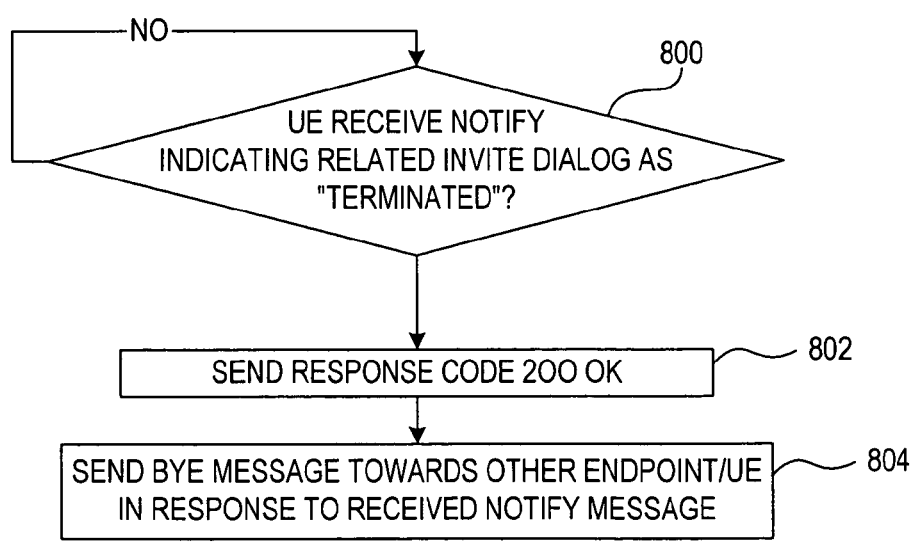
FIG. 8 is a flow diagram illustrating the manner in which the UE responds to receipt of a session release notification in accordance with one embodiment of the invention.

FIG. 8 is a flow diagram illustrating the manner in which the UE shall respond to receipt of a session release notification in accordance with one embodiment of the invention. When the UE receives a NOTIFY that indicates a related INVITE dialog as "terminated" as determined at decision block 800, the UE will respond 802 with an appropriate response code such as a 200 OK. The UE will treat the received NOTIFY as a trigger for a BYE message towards the other UE, as illustrated at block 804. The remote UE sending such a BYE message may not be assured, as a UE generally cannot be trusted. However, this BYE request is sent in order to complete SIP transactions.

Figure 9:
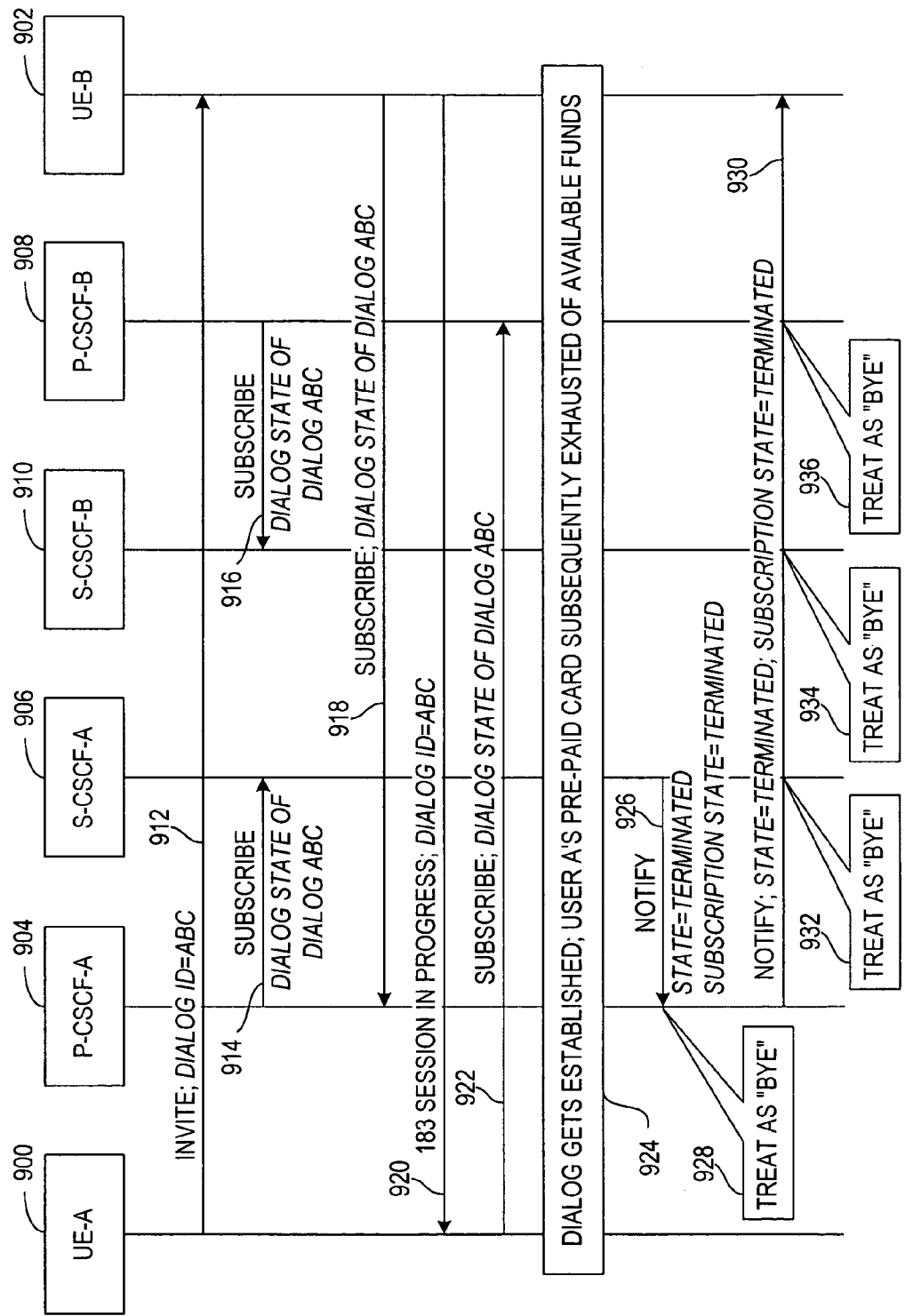
FIG. 9 is a call flow diagram illustrating a representative example of how the present invention may be used to handle a dialog release at an S-CSCF in accordance with the invention.

FIG. 9 is a call flow diagram illustrating a representative example of how the present invention may be used to handle a dialog release at an S-CSCF in accordance with the invention. The illustrated example is described in an IMS environment, including UE-A 900 and UE-B 902 as the dialog endpoints, P-CSCF-A 904 and S-CSCF-A 906 supporting UE-A 900, and P-CSCF-B 908 and S-CSCF-B 910 supporting UE-B 902. This example illustrates a call flow where the initial subscriptions are established, and a call release subsequently occurs due to User A's pre-paid card exhausting its available balance.

UE-A 900 initiates the dialog by issuing an INVITE 912 having a dialog ID of ABC. The INVITE is targeted to UE-B 902. When P-CSCF-A 904 receives the INVITE, it subscribes 914 to the Dialog State of dialog ABC at S-CSCF-A 906. When P-CSCF-B 908 receives the INVITE, it subscribes 916 to the Dialog State of dialog ABC at S-CSCF-B 910. When UE-B 902 receives the INVITE, it subscribes 918 to the Dialog State of dialog ABC at the remote P-CSCF, namely P-CSCF-A 904. If P-CSCF-B 908 becomes aware that UE-B 902 is not subscribing 918 to the remote P-CSCF-A 904, P-CSCF-B 908 itself can subscribe to P-CSCF-A 904. UE-B 902 issues a response code, such as a 183 Session In Progress 920, to UE-A 900. In response, UE-A 900 subscribes 922 to the Dialog State of dialog ABC at its remote P-CSCF, namely P-CSCF-B 908. At this point, the dialog and subscriptions are established.

At some point, it is assumed that User A's (UE-A) pre-paid card exhausts its available funds—i.e., the card runs out of money as illustrated at block 924. S-CSCF-A 906 is the network entity that will know this fact, and will issue a NOTIFY 926 to its subscriber, the P-CSCF-A 904. The NOTIFY 926 includes a call state indicating "terminated," and a subscription state indicating "terminated." The P-CSCF-A 904 treats this NOTIFY 926 as a BYE as shown at block 928 and releases the call state at P-CSCF-A 904. P-CSCF-A 904 then generates a NOTIFY 930, again indicating a call state of "terminated," and a subscription state of "terminated." As the NOTIFY 930 advances towards the remote UE-B 902, the S-CSCF-A 906, S-CSCF-B 910, and P-CSCF-B 908 treat the NOTIFY 930 as a BYE as indicated at blocks 932, 934 and 936 respectively. In this manner, the intermediary network elements that otherwise would not be able to send a SIP BYE message, can clear their call states.

At the CSCFs, hardware, firmware, software or a combination thereof may be used to perform the CSCF functions and operations in accordance with the invention. An example of a representative computing implementation of an S-CSCF 1000 capable of carrying out operations in accordance with the invention is illustrated in FIG. 10.

The representative S-CSCF computing arrangement suitable for performing the subscription, notification, and release functions includes a central processor 1002, which may be coupled to memory 1004 and storage 1006. The processor 1002 carries out a variety of standard computing functions as is known in the art, as dictated by software and/or firmware instructions. The storage 1006 may represent firmware, hard-drive storage, etc. The storage 1006 may also represent other types of storage media to store programs, such as programmable ROM (PROM), erasable PROM (EPROM), etc. The processor 1002 may communicate with other internal and external components through input/output (I/O) circuitry 1008. The S-CSCF may also include one or more media drive devices 1010, including hard and floppy disk drives, CD-ROM drives, DVD drives, and other hardware capable of reading and/or storing information. In one embodiment, software for carrying out the operations in accordance with the present invention may be stored and distributed on CD-ROM, diskette or other form of media capable of portably storing information, as represented by media devices 1012. These storage media may be inserted into, and read by, the media drive devices 1010. Such software may also be transmitted to the S-CSCF 1000 via data signals, such as being downloaded electronically via a network, such as the Internet 1014, Local Area Network (LAN) 1016.

In accordance with one embodiment of the invention, the storage 1006, memory 1004, and/or media devices 1012 store the various programs and data used in connection with the present invention. In the illustrated embodiment of FIG. 10, the storage 1006 is shown storing the various program modules, operable in connection with the processor 1002. For example, the illustrated embodiment depicts a subscription management module 1020, release recognition module 1022, notification module 1024, notification management module 1026, and session termination module 1028. The subscription management module 1020 manages the subscriptions by other entities in accordance with the invention, such as subscriptions by its associated P-CSCF. The release recognition module 1022 determines whether a call should be released at the S-CSCF, such as when the associated user's pre-paid account has expended its available balance and the call should therefore be terminated. The notification module 1024 performs the notification function, including generating the NOTIFY message with the appropriate call state and subscription state that is targeted for its associated P-CSCF. The notification management module 1026 manages the notifications received at the S-CSCF. More particularly, this module 1026 will receive the NOTIFY indication and determine at least the call state to determine if it indicates a "terminated" state. This may be performed, for example, by monitoring a particular header value(s) in the received NOTIFY message. Where the call state of the NOTIFY generated by its associated P-CSCF indicates "terminated," the session termination module 1028 will treat the NOTIFY as a BYE message and release the call state at the signaling level.

Figure 10:
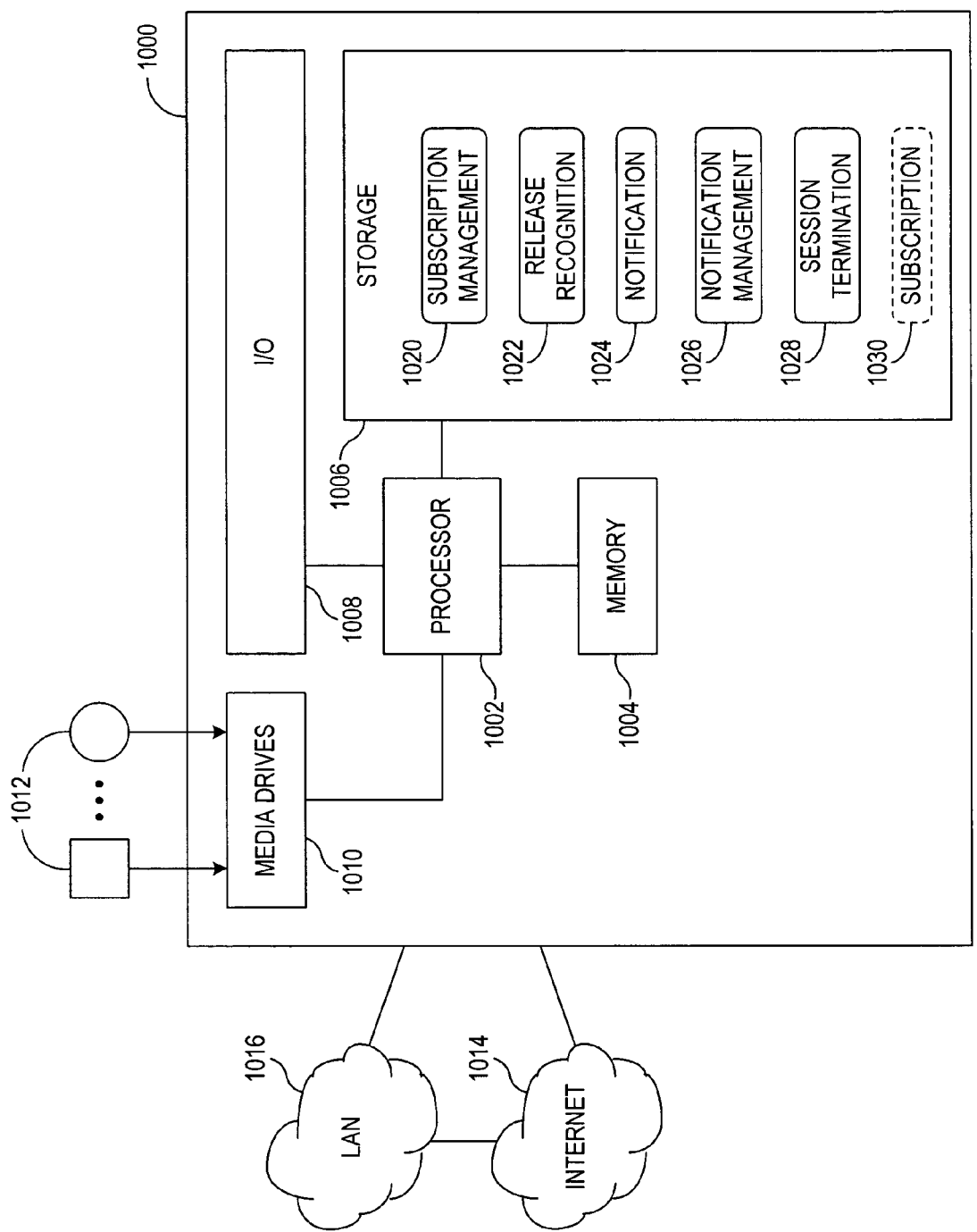
FIG. 10 illustrates a representative computing implementation of a CSCF capable of carrying out operations in accordance with the invention.

A representative P-CSCF would be similar to that shown in FIG. 10, and may include modules such as the subscription management module 1020, release recognition module 1022, notification module 1024, notification management module 1026, session termination module 1028, and subscription module 1030. Because the P-CSCF serves as a subscriber as well as a notifier, the subscription module 1030 issues the subscription request, such as a SIP SUBSCRIBE request, to the associated S-CSCF. The subscription management module 1020 for the P-CSCF manages the subscriptions by other entities in accordance with the invention, such as subscriptions by its attached UE. The release recognition module 1022 determines whether a call has been released at the P-CSCF, such as when an attached mobile user moves out of the radio coverage area. The notification module 1024 in a P-CSCF performs the notification function, including generating the NOTIFY message with the appropriate call state and subscription state that is targeted for the remote UE. The notification management module 1026 manages notifications received at the P-CSCF from its S-CSCF notifier. More particularly, this module 1026 may receive a NOTIFY indication from the S-CSCF, and will monitor the call state and subscription state to determine whether the states are "terminated." If so, the notification module 1024 will generate a new NOTIFY to send towards the remote UE. Where the call state of the NOTIFY generated by its associated S-CSCF indicates "terminated," the session termination module 1028 will treat the NOTIFY as a BYE message and release the call state and the subscription state at the signaling level.

The computing arrangement 1000 of FIG. 10 is provided as a representative example of a computing environment in which the principles of the present invention may be applied. From the description provided herein, those skilled in the art will appreciate that the present invention is equally applicable in a variety of other computing arrangements. Thus, the present invention is applicable in any known computing structure where data may be communicated via a network.

Figure 11:
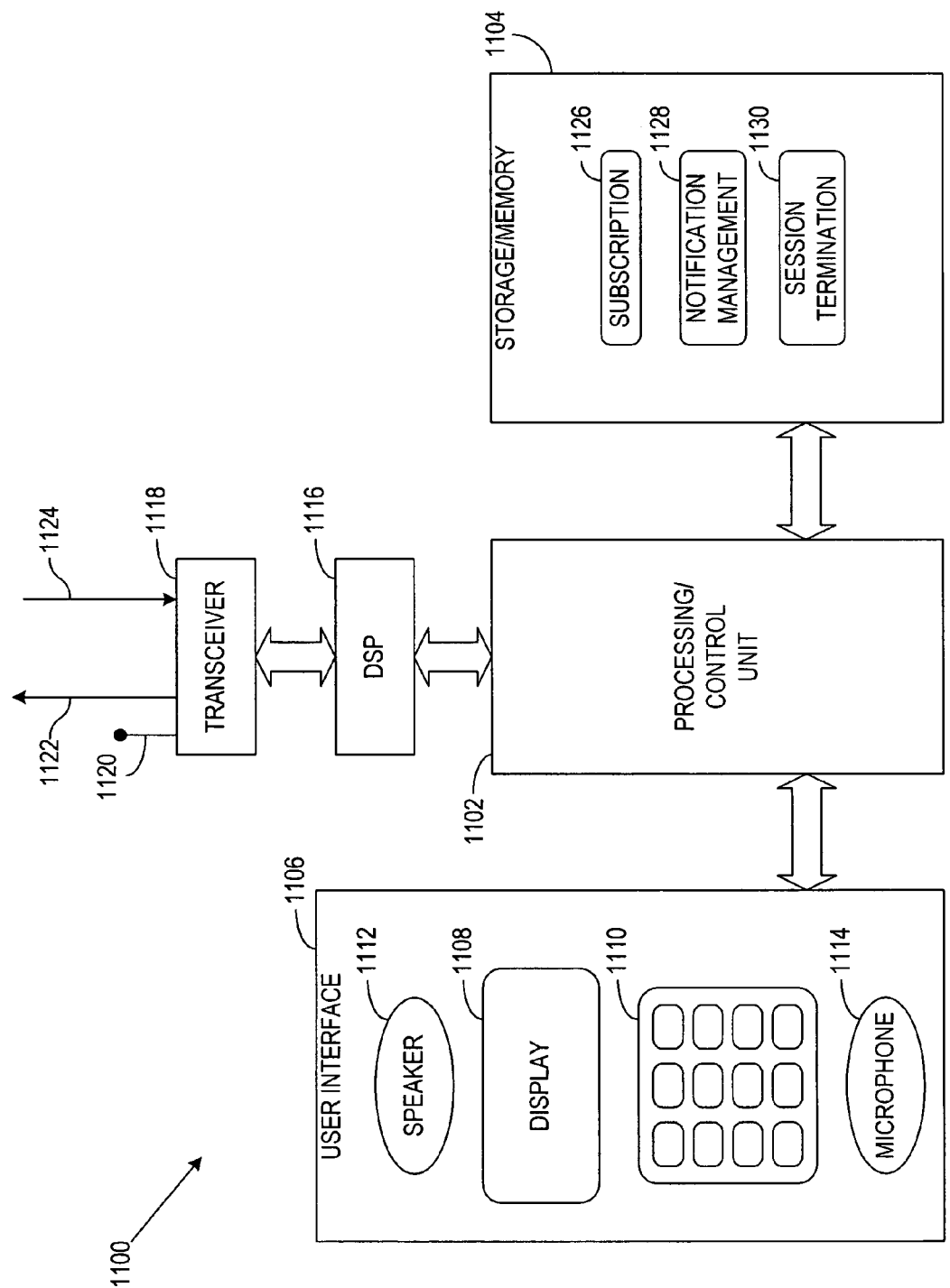
FIG. 11 illustrates a representative mobile device which may serve as a UE in accordance with the present invention.

Analogously, hardware, firmware, software or a combination thereof may be used to perform the UE functions and operations in accordance with the invention. The UE devices in accordance with the invention include communication devices compliant with the signaling protocol employed, such as SIP-enabled devices. These devices include, for example, mobile phones, PDAs, and other wireless communicators, as well as landline computing systems and communicators. A representative example of a mobile device which may serve as a UE in accordance with the present invention is illustrated in FIG. 11. The mobile device 1100 utilizes computing systems to control and manage the conventional device activity as well as the functionality provided by the present invention. The representative mobile device 1100 includes a computing system capable of carrying out operations in accordance with the invention. For example, the representative mobile device 1100 includes a processing/control unit 1102, such as a microprocessor, reduced instruction set computer (RISC), or other central processing module. The processing unit 1102 need not be a single device, and may include one or more processors. For example, the processing unit may include a master processor and associated slave processors coupled to communicate with the master processor.

The processing unit 1102 controls the basic functions of the mobile device 1100 as dictated by programs available in the program storage/memory 1104. The storage/memory 1104 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the mobile device. The storage 1104 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 1100 via data signals, such as being downloaded electronically via one or more networks, such as the Internet and an intermediate wireless network(s).

For performing other standard mobile device functions, the processor 1102 is also coupled to user-interface 1106 associated with the mobile device 1100. The user-interface (UI) 1106 may include, for example, a display 1108 such as a liquid crystal display, a keypad 1110, speaker 1112, and microphone 1114. These and other UI components are coupled to the processor 1102 as is known in the art. The keypad 1110 may include alpha-numeric keys for performing a variety of functions, including dialing numbers for conventional cellular communication, and/or effecting SIP-based communication. Other UI mechanisms may be employed, such as voice commands, switches, touch pad/screen, graphical user interface using a pointing device, trackball, joystick, or any other user interface mechanism.

The wireless device 1100 may also includes conventional circuitry for performing wireless transmissions over the mobile network. The DSP 1116 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1118, generally coupled to an antenna 1120, transmits the outgoing radio signals 1122 and receives the incoming radio signals 1124 associated with the mobile device 1100.

In the illustrated embodiment, the storage/memory 1104 stores the various client programs such as the user agent (UA) involved in a dialog with another UE. For example, the storage 1104 includes the subscription 1126, notification management 1128, and session termination 1130 modules. The subscription module 1126 issues the subscription request, such as a SIP SUBSCRIBE request, to the remote P-CSCF. The notification management module 1128 manages notifications received at the device 1100 from the remote P-CSCF when a release has occurred at the remote P-CSCF/S-CSCF. The session termination module 1130 treats a received NOTIFY as a trigger for issuing a BYE message towards the other UE.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method for releasing a communication session involving network entities including session endpoints and intermediary network entities that provide call session control, comprising:
    subscribing one or more of the network entities as subscribers to one or more of the intermediary network entities serving as notifiers;
    making a determination independently of the session endpoints to release the communication session at a first one of the notifiers;
    releasing the communication session at the first notifier;
    initiating a session release notification via a signaling protocol from the first notifier to its respective subscriber;
    logically advancing the session release notification towards a remote one of the session endpoints via the intermediary network entities; and
    terminating the communication session at each of the network entities receiving the session release notification.

2. The method as in claim 1, wherein the signaling protocol comprises a Session Initiation Protocol (SIP), and wherein the intermediary network entities comprise Call Session Control Functions (CSCFs) in an IP Multimedia core network Subsystem (IMS).

3. The method as in claim 1, wherein initiating a session release notification comprises generating the session release notification in conformance with the signaling protocol, and wherein logically advancing the session release notification comprises passing the session release notification to the remote session endpoint by way of the intermediary network entities.

4. The method as in claim 3, wherein the first notifier comprises a Proxy Call Session Control Function (P-CSCF) in an IP Multimedia core network Subsystem (IMS).

5. The method as in claim 3, wherein passing the session release notification to the remote session endpoint by way of the intermediary network entities comprises forwarding the session release notification from one intermediary network entity to another intermediary network entity until reaching the remote session endpoint.

6. The method as in claim 1, wherein initiating a session release notification comprises generating a first session release notification in conformance with the signaling protocol, and wherein logically advancing the session release notification comprises:

sending the first session release notification to the subscriber of the first notifier, wherein the subscriber of the first notifier serves as a second notifier to the remote one of the session endpoints; and
    generating a second session release notification at the second notifier, and passing the second session release notification to the remote session endpoint by way of the intermediary network entities.

7. The method as in claim 6, wherein the first notifier comprises a Serving Call Session Control Function (S-CSCF), and the second notifier comprises a Proxy Call Session Control Function (P-CSCF), in an IP Multimedia core network Subsystem (IMS).

8. The method as in claim 1, wherein terminating the communication session at each of the network entities comprises treating the session release notification as a session termination message in conformance with the signaling protocol at each of the network entities receiving the session release notification.

9. The method as in claim 8, further comprising issuing a session termination message at the remote session endpoint towards at least one other session endpoint in response to receiving the session release notification and before terminating the communication session at the remote session endpoint.

10. The method as in claim 1, wherein subscribing one or more of the network entities as subscribers comprises subscribing in conformance with the signaling protocol.

11. The method as in claim 10, wherein subscribing in conformance with the signaling protocol comprises subscribing via a Session Initiation Protocol (SIP).

12. The method as in claim 1, wherein the signaling protocol comprises an end-to-end signaling protocol.

13. The method as in claim 12, wherein the end-to-end signaling protocol comprises a Session Initiation Protocol (SIP), and wherein the intermediary network entities comprise Call Session Control Functions (CSCFs) in an IP Multimedia core network Subsystem (IMS).

14. The method as in claim 1, wherein at least one of the network entities serves as both a subscriber and a notifier.

15. A method for releasing a dialog established over an IP Multimedia core network Subsystem (IMS) that supports services via the Session Initiation Protocol (SIP), wherein the IMS includes a plurality of Call Session Control Functions (CSCFs) including at least a Proxy CSCF (P-CSCF) and a Serving CSCF (S-CSCF) associated with each User Equipment (UE) involved in the dialog, the method comprising:
    initiating the dialog from one UE towards another UE;
    subscribing each P-CSCF associated with the dialog to its respective S-CSCF, and subscribing each of the UEs to the P-CSCF associated with the other UE;
    generating a SIP session release notification at one of the CSCFs associated with a release of the dialog and transmitting the SIP session release notification towards its subscriber; and
    releasing a dialog state at the remaining CSCFs as a result of the generation and transmission of the SIP session release notification.

16. The method as in claim 15, further comprising releasing the dialog state at least one of the UEs as a result of the generation and transmission of the SIP session release notification.

17. The method as in claim 15, wherein the CSCF associated with the release of the dialog comprises a first one of the S-CSCFs, and wherein generating a SIP session release notification at the first S-CSCF comprises generating a SIP NOTIFY message and transmitting the SIP NOTIFY message towards a corresponding first P-CSCF that subscribed to the first S-CSCF.

18. The method as in claim 17, wherein releasing a dialog state at the remaining CSCFs comprises: generating a second SIP NOTIFY message at the first P-CSCF, and transmitting the second SIP NOTIFY message towards the UE that subscribed to the first P-CSCF; and releasing the dialog state at the remaining S-CSCFs and P-CSCFs in a path from the first P-CSCF towards the UE that subscribed to the first P-CSCF.

19. The method as in claim 18, wherein releasing the dialog state at the remaining S-CSCFs and P-CSCFs comprises treating the second SIP NOTIFY message as a SIP BYE at each of the remaining S-CSCFs and P-CSCFs.

20. The method as in claim 18, further comprising receiving the second SIP NOTIFY message at the UE that subscribed to the first P-CSCF, and transmitting a SIP BYE message from the UE that subscribed to the first P-CSCF towards the other UE.

21. The method as in claim 20, further comprising releasing the dialog state at the UE receiving the SIP BYE message.

22. The method as in claim 15, wherein the CSCF associated with the release of the dialog comprises a first one of the P-CSCFs, and wherein generating a SIP session release notification at the first P-CSCF comprises generating a SIP NOTIFY message and transmitting the SIP NOTIFY message towards the UE that subscribed to the first P-CSCF.

23. The method as in claim 22, wherein releasing a dialog state at the remaining CSCFs comprises releasing the dialog state at the remaining S-CSCFs and P-CSCFs in a path from the first P-CSCF towards the UE that subscribed to the first P-CSCF.

24. The method as in claim 23, further comprising receiving the SIP NOTIFY message at the UE that subscribed to the first P-CSCF, and transmitting a SIP BYE message from the UE that subscribed to the first P-CSCF towards the other UB.

25. The method as in claim 24, further comprising releasing the dialog state at the UE receiving the SIP BYE message.

26. The method as in claim 23, wherein releasing the dialog state at the remaining S-CSCFs and P-CSCFs comprises treating the second SIP NOTIFY message as a SIP BYE at each of the remaining S-CSCFs and P-CSCFs.

27. The method as in claim 15, further comprising subscribing a first P-CSCF associated with a non-compliant UE with a second P-CSCF associated with the other UE.

28. The method as in claim 15, wherein the SIP session release notification comprises a SIP NOTIFY message including a state indication identifying a terminated state for the dialog, and further including a subscription state indication identifying a terminated subscription.

29. A system for communicating over an IP Multimedia core network Subsystem (IMS), comprising:
first and second User Equipments (UE) configured to engage in a dialog over the IMS;
a plurality of Call Session Control Functions (CSCF) associated with the IMS, comprising first and second Serving CSCFs (S-CSCF) and first and second Proxy CSCFs (P-CSCF);

wherein:
the first and second P-CSCFs serve as first points of communication within the IMS for the first and second UEs respectively, and are coupled to communicate with at least the first and second S-CSCFs respectively;
the first and second P-CSCFs are configured to subscribe to the first and second S-CSCFs respectively, and the first and second UEs are configured to subscribe to the second and first P-CSCFs respectively;
each of the CSCFs comprise a release recognition module configured to independently identify a release of the dialog, and a notification module to generate a release notification for transmission towards its respective subscriber; and
each of the UBs and CSCFs comprise a session release module configured to release the dialog in response to receiving the release notification.

30. The system as in claim 29, wherein each of the first and second UEs is further configured to initiate a second release notification for transmission towards the other one of the first and second UEs to release the dialog, in response to receiving the release notification originating at one of the CSCFs.

31. A computer-readable medium having instructions stored thereon which are executable by a Call Session Control Function (CSCF) computer system for releasing a dialog established over an IP Multimedia core network Subsystem (IMS), the instructions executable by the CSCF computer system for performing steps comprising:
independently determining whether a session should be released at the CSCF;
accepting a subscription to a session release notification from a User Equipment (UE), wherein the session release notification includes a directive for the UE to release the session at the UE; and
generating the session release notification for transmission to the UE in response to the session being released at the CSCF.

32. The computer-readable medium as in claim 31, wherein the instructions executable by the CSCF computer system further comprises instructions for performing steps comprising:
parsing second session release notifications received from a second CSCF associated with the session, and in response identifying an indication to release the session at the CSCF; and
releasing the session at the CSCF if the indication to release the session at the CSCF is identified.

33. The computer-readable medium as in claim 31, wherein the instructions executable by the CSCF computer system further comprises instructions for performing steps comprising issuing a subscription request to a second CSCF associated with the session, wherein the subscription request comprises a request for session release notifications originating at the second CSCF associated with the session.

* * * * *

UNITED STATES PATENT AND TRADEMARK OFFICE
CERTIFICATE OF CORRECTION

PATENT NO. : 7,283,506 B2 Page 1 of 1
APPLICATION NO. : 10/684269
DATED : October 16, 2007
INVENTOR(S) : Georg Mayer et al.

It is certified that error appears in the above-identified patent and that said Letters Patent is hereby corrected as shown below:

Col. 21, Claim 24, line 39: "UB" should be --UE--.

Col. 22, Claim 29, line 18: "UBs" should be --UEs--.

Signed and Sealed this

Eighteenth Day of December, 2007

JON W. DUDAS
*Director of the United States Patent and Trademark Office*